United States Patent [19]

Cyrot

[11] 4,138,088
[45] Feb. 6, 1979

[54] DEVICE FOR CONTROLLING HYDRAULIC MOTORS

[75] Inventor: Luc P. Cyrot, Mission Viejo, Calif.

[73] Assignee: Parker-Hannifin Corporation, Cleveland, Ohio

[21] Appl. No.: 755,935

[22] Filed: Dec. 30, 1976

[51] Int. Cl.² .......................... F16K 31/12; F01B 1/00
[52] U.S. Cl. ........................................ 251/30; 91/186;
   91/363 A; 92/73; 92/146; 137/625.64
[58] Field of Search ................ 91/186, 361, 413, 414,
   91/363 A; 137/625.64; 92/68, 73, 146; 251/30, 28

[56] References Cited
U.S. PATENT DOCUMENTS

| | | | |
|---|---|---|---|
| 3,263,572 | 8/1966 | Sunderland | 91/361 |
| 3,585,902 | 6/1971 | Anderson | 91/186 |
| 3,750,532 | 8/1973 | Kubilos | 91/186 |
| 3,817,150 | 6/1974 | Cox | 91/186 |
| 3,915,427 | 10/1975 | Swogger | 137/625.64 |

Primary Examiner—Martin P. Schwadron
Assistant Examiner—Abraham Hershkovitz
Attorney, Agent, or Firm—John N. Wolfram

[57] ABSTRACT

A device for controlling hydraulic motors as in an aircraft "fly-by-wire" system wherein redundant hydraulic motors and controls are required to protect against failure of portions of the system or device. The device includes two master valves for controlling flow of fluid to and from the motors, one controlled by electrical signals from a command station and the other controlled mechanically through manual or automatic operation. There is a transfer valve for selecting which of the master valves is to be operable and to provide for smooth transition of control from the electrically controlled valve to the mechanically controlled valve. The electrically controlled valve is positioned by means of an articulated command shaft of hybrid force displacement summing structure having redundant hydraulic drive units each controlled by redundant electrohydraulic servo valves and wherein failed servo valves are accounted for in the force displacement summing structure in a manner to avoid the need for rapid failure detection and correction.

20 Claims, 5 Drawing Figures

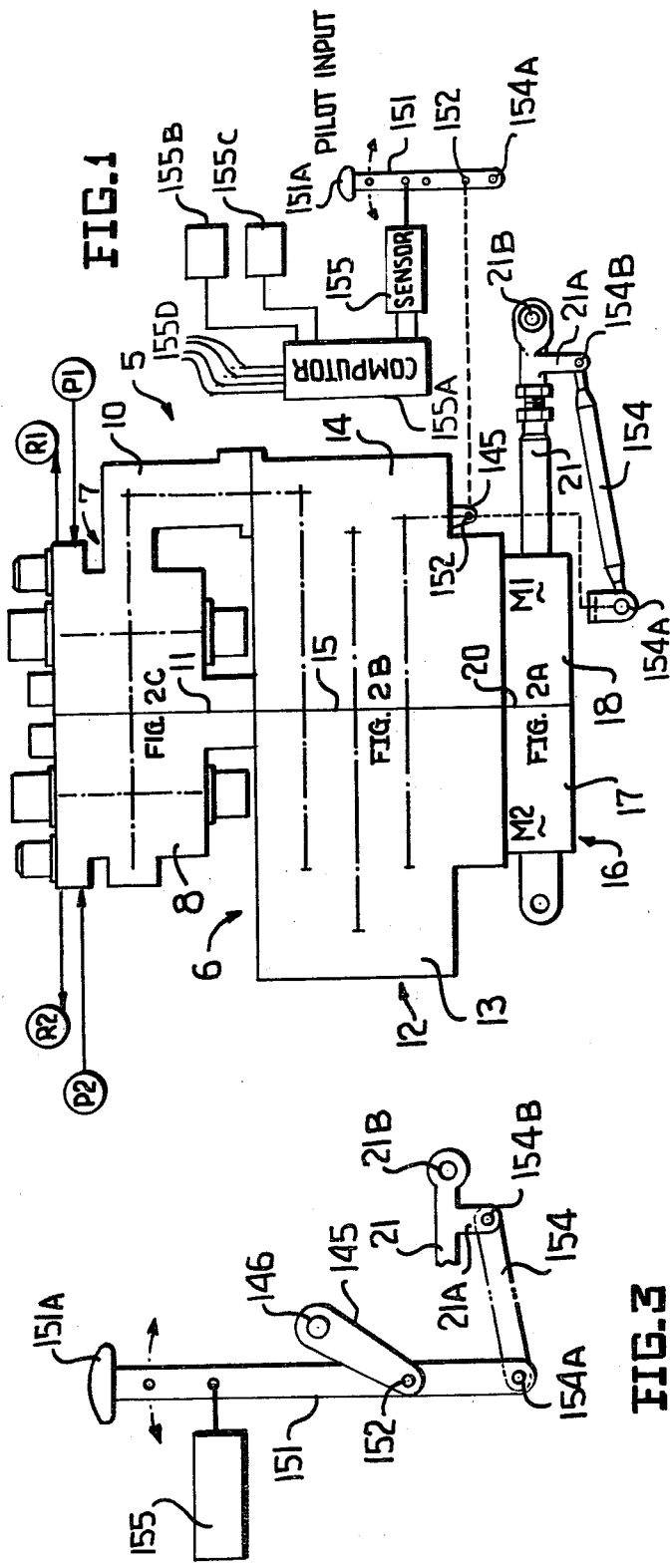
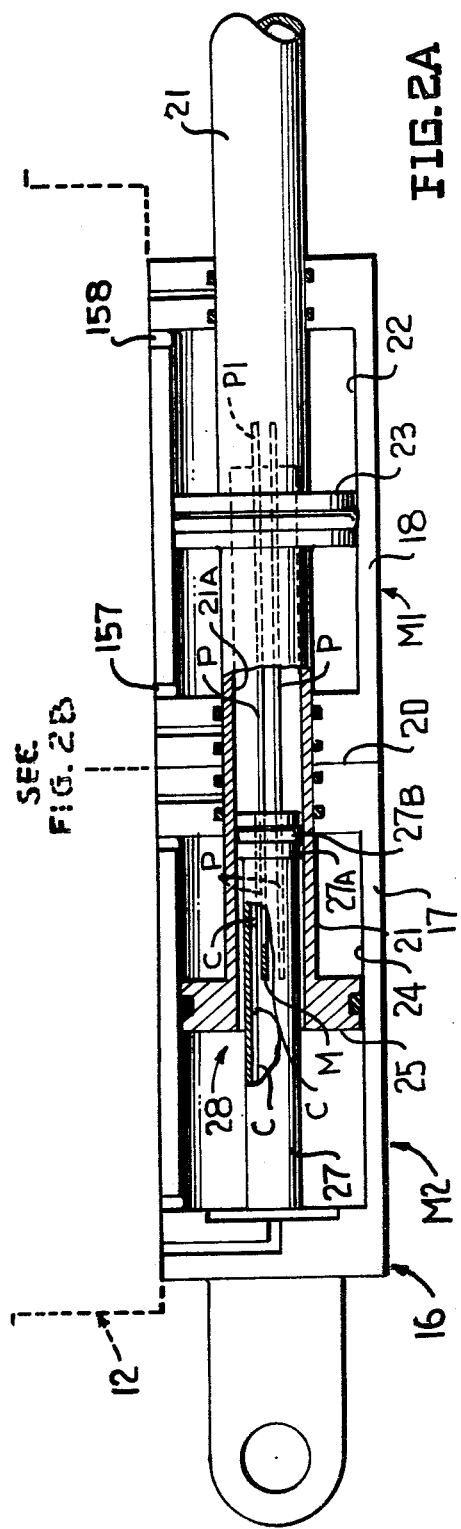

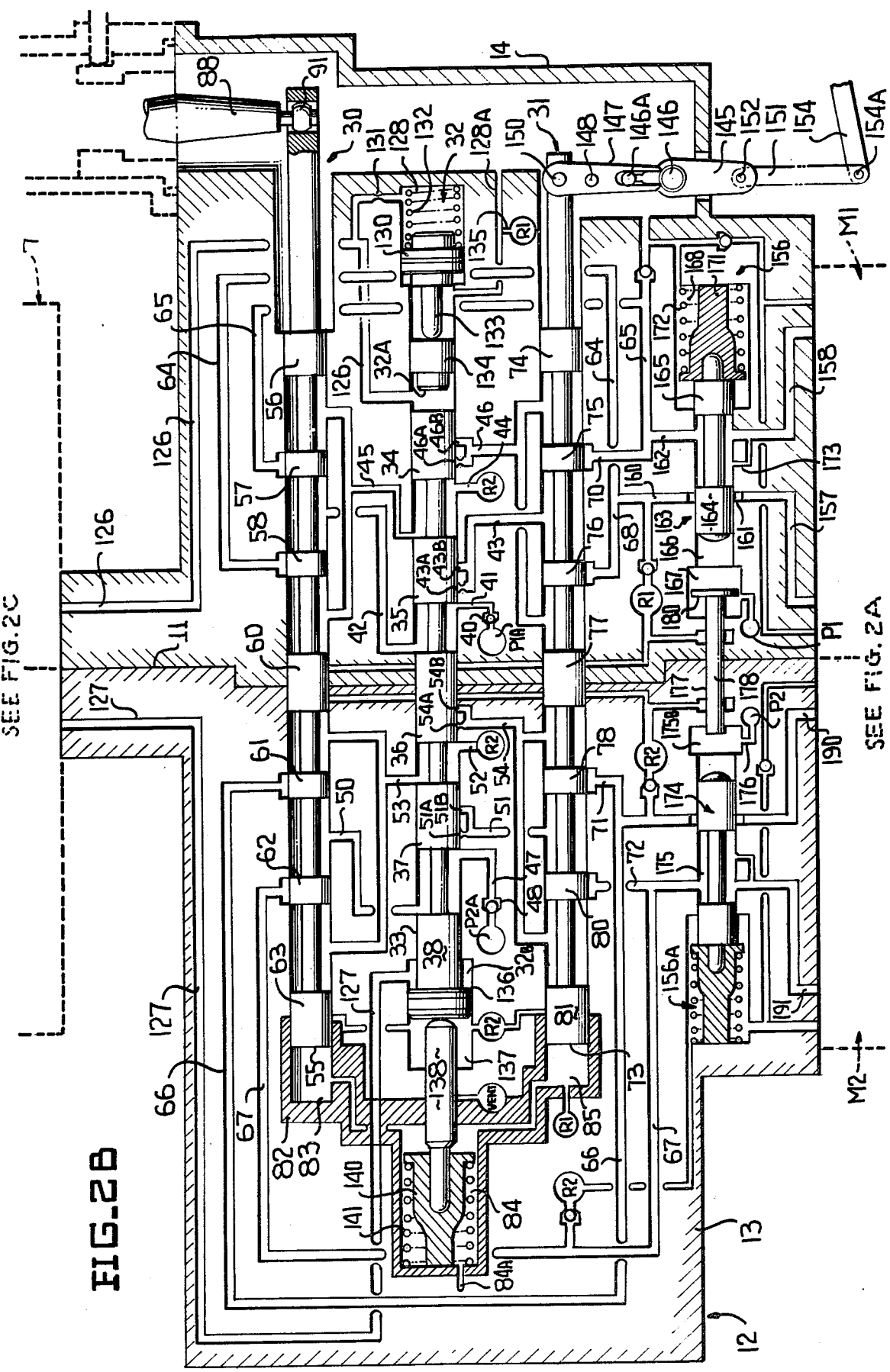

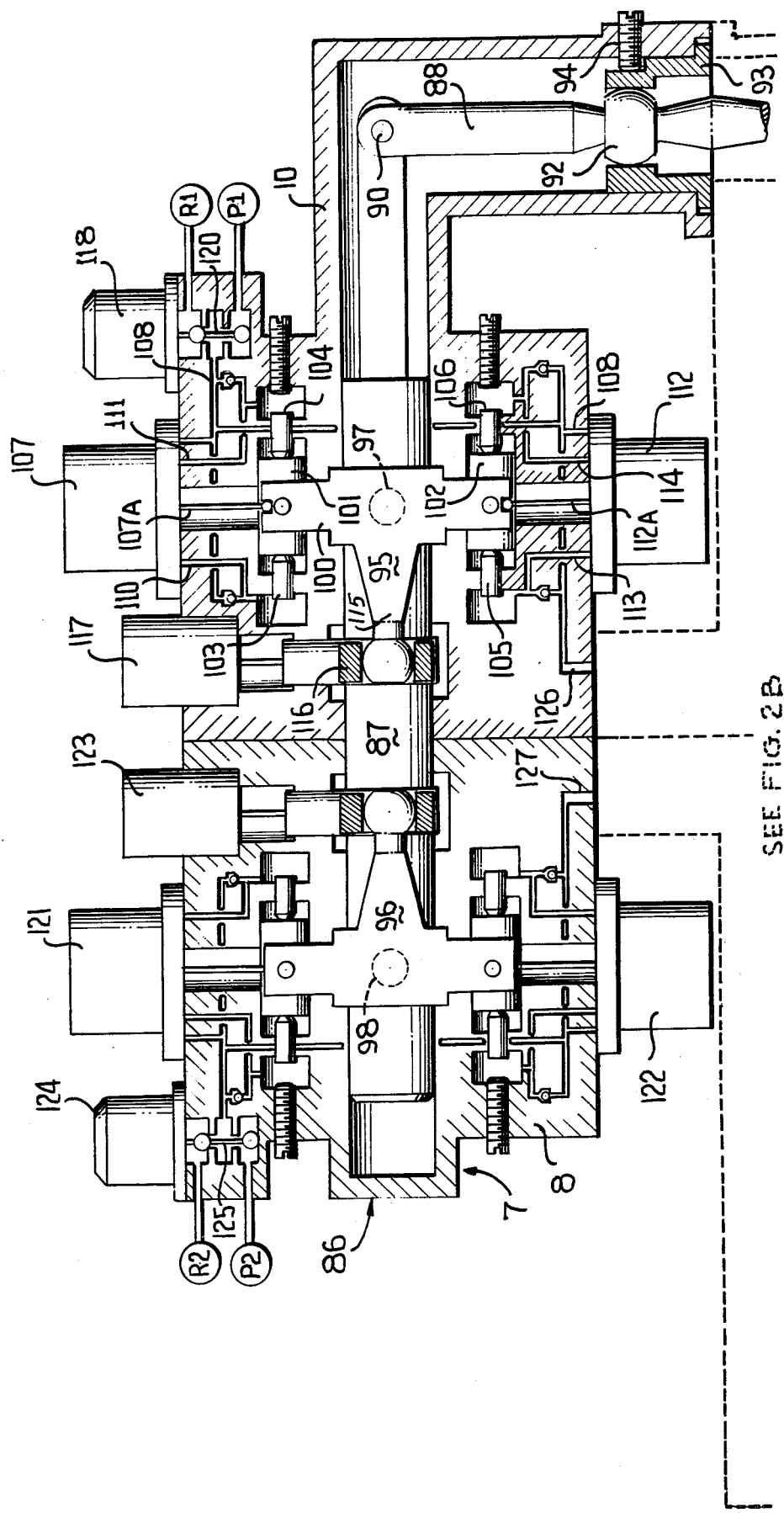

DEVICE FOR CONTROLLING HYDRAULIC MOTORS

BACKGROUND OF THE INVENTION

This invention relates generally to systems and devices for controlling hydraulic motors and in particular relates to such systems and devices for aircraft hydraulic systems that are referred to as "fly-by-wire". In such systems electrical signals originating at a remote command station are transmitted to electro-hydraulic servo valves that control master valves that direct flow of fluid to and from hydraulic motors. For safety reasons the systems employ redundant components and control channels so that the system will operate despite failure of some of the components and/or control channels. Such redundancy is particularly important in fly-by-wire systems because the electrical components do not have the high degree of reliability that mechanical and hydraulic components provide.

In previous fly-by-wire systems various methods have been employed for detecting, correcting and/or overriding failed components and control channels so that the hydraulic motors could be operated in a proper manner despite such failures. These methods have not been entirely satisfactory because of complexity, time lag in compensating for failures, and other reasons.

SUMMARY OF THE INVENTION

The present invention provides a device for an aircraft fly-by-wire hydraulic system that employs redundant hydraulic components and control channels for effecting operation of redundant hydraulic motors that actuate flight control surfaces, such as a rudder or ailerons, and wherein the system and device will automatically continue proper operation upon failure of parts of the device and/or control channels without requiring rapid failure detection and switch over to standby units. This is accomplished by providing a hybrid type force and displacement summing structure in the form of an articulated command shaft for operating an electrically controlled master valve (electric master valve) and which is activated by redundant hydraulic drive units controlled by redundant electro-hydraulic servo valves, sometimes referred to as fluid amplifiers. The command shaft carries a pair of pivoted drive members operated on by drive units which move the shaft for shifting the electrical master valve. Upon failure of a servo valve or a drive unit, the associated pivoted drive member tilts and actuates a detector that shuts off the failed portion of the device and permits the remaining unfailed drive units and servo valves to continue proper operation of the command shaft and electric master valve.

To protect against failure of the electric master valve, the drive units, and/or the servo valves, a mechanically operated master valve (mechanical master valve) is provided. It is mechanically operated by suitable linkage connected to an operating lever that is manually positioned by the pilot.

The mechanical master valve is non-functional until it is put into operation by a transfer valve upon failure of the drive units to properly operate the command shaft for controlling the electric master valve. It is non-functional at such time because fluid under pressure is not being directed to it for delivery to the hydraulic motors. Even though it may be in a non-functioning mode, the mechanical master valve is moved through its mechanical connection to the pilot's control lever. Its position may not at all times correspond exactly with the position of the electric valve because the latter's position is determined both by a sensor that senses the position of the pilot's control lever as well as inputs of other sensors that sense other criteria. Upon failure of the command shaft to be operated for properly controlling the electric master valve, the transfer valve automatically makes the mechanical master valve functional by cutting off the supply of fluid under pressure to the electric valve and directing it to the mechanical valve for delivery to the motors.

Movement of the mechanical master valve is roughly synchronized with that of the electric master valve but when it is made functional by the transfer valve it could be sufficiently out of position to require a large command for causing it to assume its proper position. To minimize the effects of such large command the transfer valve has orifices that are temporarily restricted to smooth the transition from control of the motors by the electric master valve to the mechanical master valve.

Bypass valves associated with the redundant hydraulic motors permit either motor to operate normally without interference from the other upon failure of the other motor.

DETAIL DESCRIPTION

FIG. 1 is an exterior view of the device with the electrical and mechanical input devices schematically illustrated.

FIG. 2A is a vertical sectional view on an enlarged scale through the lower part of the device.

FIG. 2B is an enlarged vertical sectional view taken through the central part of the device.

FIG. 2C is an enlarged vertical sectional view taken through the upper part of the device.

FIG. 3 is a view of linkage for manual operation of the system.

The control device is generally identified by the numeral 5 and includes a composite housing 6. The housing 6 is made up of an upper portion 7 which includes housing units 8 and 10 separated generally along a vertical juncture line 11.

The housing 6 also includes a central portion 12 which includes housing parts 13 and 14 having a generally vertical juncture line 15. Finally, the housing 6 includes a lower portion 16 including housing parts 17, 18 having a vertical juncture line 20.

The control device 5 includes an actuating rod 21 that extends out of the right side housing part 18 and whose outer end 21B is connectable to an aircraft control surface, not shown, that is to be actuated. Housing part 18 defines a fluid motor M1 including cylinder 22 and piston 23, piston 23 being rigidly attached to rod 21.

Housing part 17 defines another fluid motor M2 that includes a cylinder 24 and piston 25. Actuating rod 21 extends through the housing part 18 into housing part 17 and is rigidly attached to piston 25.

Housing part 17 carries a cylindrical housing 27 of a linear variable differential transducer (LVDT) 28. Housing 27 has an enlarged head 27A at one end that carries a sealing ring 27B. Actuating rod 21 has a bore 21A to receive housing 27 and ring 27B is in sliding sealing contact with bore 21A. Fixedly mounted within housing 27 are several electrical coils C and attached at P1 to actuating rod 21 are four probes P that carry magnetic members M. As rod 21 moves between retracted and extended positions, probes P move the magnetic members M relative to coils C to provide an electrical signal for indicating the exact position of rod 21, all in a manner that is well known.

Pressurized fluid source P1 and return R1 are associated with motor M1 while pressurized fluid source P2 and return R2 are associated with motor M2. Flow between these motors and their respective fluid source and return are controlled by electric master valve 30 and mechanical master valve 31 positioned within housing portion 12. A transfer valve 32 is positioned between valves 30, 31 and determines which of valves 30, 31 is to control flow of fluid to and from motors M1, M2. When spool 33 of transfer valve 32 is in its leftward position, as shown, electric valve 30 is functional and when in its rightward position mechanical valve 31 is functional.

Spool 33 includes lands 34, 35, 36, 37 and 38 in longitudinally spaced relation. A port in housing part 14 supplies pressurized fluid from fluid source P1 through check valve 40 to conduit 41 opening to spool 33 between lands 35, 36. Land 36 controls fluid flow from conduit 41 into conduit 42 leading to electric valve 30 while land 35 controls flow to conduit 43 leading to mechanical valve 31. Conduit 44 couples a port in housing part 14 connected to return R1 to spool 33 between lands 34, 35. Land 35 controls flow from electric valve 30 to R2 via conduits 45, 44 while land 34 controls flow to R1 from conduit 46 connected to mechanical valve 31.

A redundant circuit is formed in housing part 13 and includes conduit 47 receiving fluid under pressure through check valve 48 from a port coupled to fluid source P2 with flow to electric valve 30 through conduit 50 being controlled by land 38 and to mechanical valve 31 through conduit 51 controlled by land 37. Return flow through conduit 52 to return R2 from electric valve 30 through conduit 53 is controlled by land 37 while land 36 controls return flow from electric valve 31 through conduit 54.

Electric valve 30 includes spool 55 having spaced lands 56, 57, 58, 60, 61, 62, 63. Conduits 64, 65 communicate with opposite ends of cylinder 22 via conduits 157 and 158 and flow thereinto from conduit 42 is controlled by lands 58, 57, respectively. In a like manner, conduit 45, which is bifurcated, has communication thereof with conduits 64, 65 controlled by lands 58, 57, respectively. Thus the right hand half of electric valve spool 55 functions to control operation of motor M1.

Housing part 13 has formed therein conduits 66, 67 leading into opposite ends of cylinder 24 via conduits 190, 191. Pressure flow from conduit 50 selectively into conduits 66, 67 is controlled by lands 61, 62, respectively. In a like manner, return flow from conduits 66, 67 to R2 via bifurcated conduit 53 and conduits 53, 52 is controlled by lands 61, 62, respectively. Thus the left hand portion of electric valve spool 55 is operable to control the operation of motor M2.

Mechanical valve 31 includes conduits 68, 70 formed in housing part 14 and opening into conduits 64, 65, respectively. Valve 31 also includes conduits 71, 72 formed in housing part 13 leading into conduits 66, 67.

Mechanical valve 31 includes spool 73 formed with longitudinally spaced lands 74, 75, 76, 77, 78, 80, 81. Conduits 43, 46 are selectively communicated with conduits 68, 70 in accordance with the position of lands 76, 75, respectively. In like manner, conduits 51, 54 are selectively placed in communication with conduits 71, 72 by positioning lands 78, 80, respectively.

Housing 6 includes a housing part 82 received in housing part 13 and defining ends portions of chambers forming parts of valves 30, 31, 32. Housing part 82 defines cavities 83, 84, 85 which are interconnected and which are connected to return R1. Cavities 83, 85 receive spool lands 63, 81 while cavity 84 contains positioning means for spool 33.

Upper housing portion 7 carries control unit 86 for controlling the position of electric valve 30 and transfer valve 32. Control unit 86 includes command shaft 87 slidably mounted in housing parts 8, 10. Command shaft 87 is pivotally connected at 90 to a link 88 that is also pivotally connected at 91 to electric valve spool 55. Link 88 has an intermediate pivot comprising spherical member 92 in a cylindrical seat 93 that is mounted between housing parts 10, 14 for transverse movement and is adjustable by means of screw 94.

Command shaft 87 is provided with a redundant drive system including identical, but oppositely facing drive members 95, 96 pivotally connected to command shaft 87 by transverse pivots 97, 98, respectively. Drive member 95 includes arm portion 100 having pivotally connected to opposite ends thereof drive elements 101, 102.

Pistons 103, 104 engage opposite ends of drive element 101 while pistons 105, 106 engage opposite ends of drive element 102. Carried by housing part 10 and associated with pistons 103, 104 is an electro-hydraulic servo valve 107, also known as a fluid amplifier, and which may be of the type described and illustrated at 21 in United States Letters Patent 3,915,427 to Emery C. Swogger. Fluid under pressure is delivered to valve 107 through conduit 108 from pressure source P1 and is divided by valve 107 and directed into conduits 110 and 111 communicating with ends of pistons 103, 104, respectively, remote from drive element 101. The position of arm portion 100 is also controlled by a feedback leaf spring 107A and is therefore proportional to the electrical current applied to servo valve 107.

Another servo valve 112, identical to valve 107 is associated with drive element 102. Valve 112 also receives fluid under pressure from conduit 108 and directs fluid at selective relative pressures to ends of pistons 105, 106 remote from drive element 103 through conduits 113, 114, respectively, and has a feedback leaf spring 112A for positioning arm portion 100 in proportion to the electrical current in servo valve 112.

In a manner to be described hereinafter, an electrical signal from a device 155 is directed to the valves 107, 112 to actuate the same in a like manner so as, for example, to apply greater pressure on pistons 103, 105 than on pistons 104, 106 so as to move the drive member 95 to the right, thus moving command shaft 87 to the right and spool member 55 to the left until the desired position of the latter is reached. The feedback springs then cancel the initial pressure differential to prevent further movement of the command shaft and spool member 55. However, if either of the servo valves 107, 112 does not function properly, then in lieu of there being an equal force applied on drive elements 101, 102 there will be an unequal force applied with the result that the arm portion 100 will pivot or tilt about pivot 97. Tilting of the arm portion 100 will result in tilting of arm portion 115 and vertical movement of follower 116 associated therewith. Follower 116 is coupled to an LVDT detector 117 which will cause actuation of solenoid 118 to shift primary valve member 120 thereof to a position terminating communication of conduit 108 with pressure source P1 and placing conduit 108 in communication with return R1. The net result will be that drive elements 101 and 102 are rendered inoperative so that command shaft 87 is driven only by servo valves 121, 122 via member 96.

The ends of pistons 103, 104, 105, 106 opposing drive elements 101, 102 are in communication with return R1 at all times.

Drive member 96 is driven in the same manner as drive member 95 under the control of servo valves 121, 122, which are identical to valve 107 and which receive similar electrical signals from device 155. However, valves 121, 122 are supplied fluid from fluid source P2 and therefore the fluid power for effecting driving of the drive member 96 is totally independent of that for driving drive member 95.

Associated with drive member 96 is a tilt detector 123 identical to detector 117. Detector 121 controls the operation of a solenoid 124 that is identical to solenoid 118. Solenoid 124 controls the position of another primary valve member 125 which, in turn, selectively couples servo valves 121, 122 to pressure source P2 or return R2.

Conduit 126, which is a continuation of conduit 108, leads to the right end of land 34 of transfer valve 32. In a like manner, conduit 127 forms a continuation of the conduit leading from primary valve member 125 to servo valves 121, 122 and is connected to chamber 32B at the left portion of transfer valve 32.

Cylinder 128 is disposed at right end of transfer valve 32 and has mounted therein a piston 130 that is normally urged to the left by light spring 132. Conduit 126 leads into cylinder 128 through restrictor 131. When primary valve member 120 has been positioned to permit flow from fluid source P1 to cylinder 128, pressure is applied to the right side of piston 130 and moves it to the left.

Piston 130 has extension 133 engaging follower 134 for moving follower 134 as far to the left as permitted by movement of piston 130. Conduit 126 also opens into space 32A between land 34 of spool 33 and follower 134 and when land 134 is to the right enough to uncover conduit 126, fluid under pressure from conduit 126 acts on the right end of land 34 to urge spool 33 to the left. The left side of piston 130 is communicated with return R1 through conduits 128A and 135.

A piston 136 is formed on the left end of spool 33 and fluid under pressure from fluid source P2, when primary valve member 125 is in the correct position, is directed through conduit 127 to the right of piston 136 for moving piston 136 and spool 33 to the left independently of the action of piston 130. To the left of piston 136 is cavity 137 in communication with return R2 so as to permit free movement of piston 136 to the left.

To the left of piston 136 is follower 138 which engages stop member 140 urged to the right by spring 141 that is stronger than spring 132. Follower 138 ensures that no transient differential pressure between R1 and R2 will overcome spring 141 when the respective primary valves 120, 125 have depressurized conduits 126, 127. Furthermore, a conduit 128A connects to a conduit 84A to interconnect chambers 84 and 128 for equalizing the pressures therein. Stop member 140 limits movement of spool 33 to the left.

When spool 33 is in its left hand position as shown, electric valve 30 is operative. When no fluid under pressure is directed against either piston 130 or the right end of spool land 34 via conduits 126, 127, spring 141, through stop 140, moves spool 33 rapidly to the right until it contacts follower 134. Such movement is rapid because fluid from 32A exhausts rapidly through unrestricted passage 126. When land 34 contacts follower 134 it also cuts off chamber 32A from conduit 126. At this time, lands 34, 35, 36 and 37 uncover restricted orifices 46A, 43A, 54A and 51A to permit restricted flow of fluid from P1 and P2 via conduits 41, 47 to mechanical valve 31 via conduits 46, 43, 54, 51. Further movement of spool 33 to the right after contacting follower 34 is at a slow rate due to slow exhausting of fluid from chamber 128 through restricted orifice 131. During this further movement, spring 141, which is stronger than spring 132, causes the latter to compress. When this movement discontinues because of bottoming of stop member 140 in its rightward position, lands 34, 35, 36 and 37 will have uncovered full flow passages 46B, 43B, 54B and 51B to establish full flow to mechanical valve 31. The operation of orifices 131, 46A, 43A, 54A and 51A as aforesaid provides a smooth transition between the last electrically controlled position of fluid motors M1 and M2 via electric valve 30 and the position commanded by the mechanically preset position of mechanical valve 31.

When electric valve 30 is moved to the left through actuation of command shaft 87 by the servo valves, fluid will be directed to the left ends of cylinders 22, 24 and exhausted from the right hand ends to move actuator rod 21 to the right. In a like manner, when mechanical valve 31 is shifted to the left, fluid under pressure will be directed to the left ends of cylinders 22, 24 and exhausted from the right hand ends to move the actuator rod 21 to the right. Similarly, when valves 30 or 31 are moved to the right fluid under pressure is directed to the right ends of cylinders 22, 24 and exhausted from the left ends to cause actuator rod 21 to move to the left.

Because of the redundant control system, in the event of failure of either of the fluid supplies P1, P2 or the failure of any of the valves 107, 112, 121, 122, there will still be fluid pressure available to keep transfer valve 32 to the illustrated position wherein electric valve 30 is operative and if only one fluid pressure supply should be available, that fluid pressure will be applied to the respective one of the pistons 23, 25 to shift the actuator rod 21. However, if both valves 118 and 124 fail, or if all four valves 107, 112, 121 and 122 fail, no fluid pressure will be delivered to either chamber 32A or 32B for maintaining transfer valve spool 33 to the left and spool 33 will be moved to the right by spring 141 as aforesaid to transfer control of motors M1 and M2 to mechanical valve 31.

Mechanical valve 31 is shifted to operative positions by means of a lever 151 that is operated manually by the pilot via a handle 151A. Lever 151 is pivotally connected at 152 to link 145 and is pivotally connected at 154A to rod 154 that in turn is pivotally connected at 154B to an arm 21A extending from piston rod 21. Link 145 is connected at 146 to member 146A that has a lost motion or geneva type connection to a lever 147 that is pivotally mounted at 148 to housing part 14 and at 150 to spool 73. Thus, lever 151 when manually operated by the pilot will shift spool 73 for positioning of actuator rod 21 in the event of failure of other parts of the system.

Lever 151 has mechanically coupled thereto an electrical signal producing device or sensor 155 which senses the position of lever 151 and sends a corresponding signal to a computer 155A that also receives signals from other sources, such as gyroscopes 155B, 155C, that detect various movements of the aircraft about its axes. Computer 155A transmits electrical current through wires 155D to valves 107, 112, 121, 122 in accordance with the signals that it receives. Valves 107, 112, 121 and/or 122 cause actuation of motors M1, M2 as aforesaid and when piston rod 21 has moved to the proper position, LVDT 28 cancels the electrical signals and electric valve 30 and transfer valve 32 return to their null position to shutoff further flow of pressure flow to motors M1 and M2.

Mechanical valve 31 is always in an operative position to the left or to the right of the null position shown in the drawings when the electric valve 30 is called upon to be in an operative position. While transfer valve 32 is not in its rightward position, pressure sources P1A and P2A, which are respectively associated with P1 and P2 but which bypass valves 118 and 124, are isolated by the transfer valve from mechanical valve 31 but are connected to such valve 31 via the transfer valve when the latter is moved to the right as described above.

As shown in FIG. 2B, the control system may include bypass valves 156, 156A disposed in the path of the conduits leading from master valves 30, 31 to motors M1, M2. With respect to motor M1, there are conduits 157, 158 opening into left and right ends of cylinder 22. Conduits 64, 68 from valves 30, 31 join in conduit 160 which communicates with conduit 157 via annular passage 161. In like manner, conduits 65, 70 join in conduit 162 which opposes conduit 158 and is connectable thereto via bore 166.

Bypass valve 156 includes right spool 163 which has spaced lands 164, 165. Spool 163 is slidably positioned in bore 166 which opens at its left end into enlarged cavity 167 and at its right end into enlarged cavity 168. Cavity 168 is in communication with return R1 while cavity 167 is in communication with pressure source P1 through passage 170. The right end of spool 163 is engaged with stop 171 which is resiliently urged to the left by spring 172.

While conduit 158 opens directly into bore 166, it is also in restricted communication with bore 166 between lands 164, 165 by conduit 173 of reduced diameter.

When pressure sources P1 and P2 are functional, spool 163 is held in the illustrated position of FIG. 2B by high pressure in chamber 167. In this position, conduit 160 is in communication with conduit 157 and conduit 162 is in communication with conduit 158 so that the fluid control of motor M1 is operable. However, in the event fluid sources P1 and P2 should fail, spring 172 urges spool member 163 to the left to a position where land 164 clears annular conduit 161 whereby the latter is placed into communication with bore 166 between lands 164, 165. At the same time, land 165 closes free flow communication between bore 166 and conduit 158 but permits restricted communication therebetween and with conduit 157 through reduced diameter conduit 173. At this time piston 23 of motor M1 is free to move in either direction in cylinder 22 at a restricted rate determined by the diameter of conduit 173.

The left hand bypass valve 156A is a mirror image of the right hand valve 156 and functions in exactly the same manner. It includes spool 174 positioned in bore 175 with bore 175 having the left end thereof in communication with return R2 and the right end thereof in communication with fluid source P2 via port 176 and chamber 175B.

Bores 166 and 175 are connected by a bore 177 in which there is slidably mounted rod 178 having an enlarged head 180 within chamber 167. When fluid sources P1 and P2 are both available, rod 178 assumes a neutral position. However, when one of the fluid sources fails, fluid under pressure will fail to be supplied to the respective chamber 167 or 175B and rod 178 shifts towards the failed area in an amount determined by the length of chamber 167. It thus functions as a stop for that one of spools 174, 163 that is adjacent the failed area and such spool is then shiftable by its associated spring 168 or 156A. For example, should the fluid source P1 fail, fluid pressure from fluid source P2 acting on left end of rod 178 would move rod 178 to the right until head 180 reaches the right end of cavity 167. There it would remain for engagement by left end of spool 163 to stop further movement of the latter due to either spring 172 or pressure of the return R1 on spool 164. At this time conduits 157, 173 and 158 are in communication with each other via bore 166 between lands 164 and 165 so that fluid from either side of motor M1 can flow to the other side and thus not interfere with operation of motor M2.

I claim:

1. A device for operating a valve comprising a linearly movable command shaft of hybrid force displacement type having means for connection to said valve, a drive member having a pivotal connection to the command shaft for linearly shifting the same, first and second drive elements connected to said drive member on opposite sides of said pivotal connection, each of said drive elements including a pair of first and second drive units acting on said drive member in opposite directions about said pivotal connection, means for varying the force with which said drive units act on said drive member, said drive units being actuated by fluid pressure from a source, said drive elements normally imparting equal and oppositely directed torques to said drive member about said pivotal connection for linearly moving the command shaft and a detector for detecting unequal application of torques to said drive member by said drive elements and being actuated in response to detection of said unequal application of torques, said detector upon actuation thereof causing supply of fluid under pressure from said source to each of said drive elements to be cut off 2. The device of claim 1 in which said drive elements extend radially from said pivotal connection and said detector includes an arm on said drive member extending radially from the pivotal connection.

3. The device of claim 2 in which a supply of fluid under pressure to said drive units from a common source is controlled by first and second electro hydraulic servo valves responsive to electrical signals for selectively varying the pressure of said fluid as controlled by each of said first and second hydraulic servo valves.

4. The device of claim 2 in which a supply of fluid under pressure from a single source to each pair of first and second drive units is controlled by a separate electro hydraulic servo valve.

5. The device of claim 4 in which each servo valve is controllable by a variable electrical signal.

6. The device of claim 4 in which said drive elements include torque arms extending from said pivotal connection to the point of engagement with said drive units, said torque arms being of equal length.

7. The device of claim 4 in which there is a single primary shutoff valve for controlling supply of fluid under pressure to said electro hydraulic valves, and said detector is responsive to said unequal application of torques to said drive member for causing said shutoff valve to close.

8. The device of claim 1 in which said drive member is caused to pivot about said pivotal connection upon said unequal application of torques, and said detector is mechanically connected to said drive member to be positively actuated by said pivoting.

9. The device of claim 8 in which said mechanical connection includes a plunger connected to said arm to be moved thereby upon pivoting of the arm in either angular direction.

10. The device of claim 1 in which there is a second drive member for linearly shifting said command shaft and having a second pivotal connection therewith, third and fourth drive elements connected to said second drive member on opposite sides of said second pivotal connection, each of said third and fourth drive elements including a pair of third and fourth drive units acting on said second drive member in opposite directions about said second pivotal connection, and means for varying the force with which said third and fourth drive units act upon said second drive member.

11. The device of claim 10 in which said third and fourth drive units are actuated by fluid pressure from a single source separate of the fluid pressure source for the first and second drive units.

12. The device of claim 11 in which the supply of fluid under pressure to each of said pair of said third and fourth drive units is respectively controlled by third and fourth electro hydraulic servo valves after passing through a single primary valve.

13. The device of claim 11 in which there are first and second detectors respectively responsive to independent pivoting of said first and second drive members about the respective pivotal connection on a common command shaft for immobilizing the respective drive elements for such pivoted drive members.

14. The device of claim 13 in which there are first and second primary shutoff valves one for opening and closing a first conduit for conveying fluid under pressure to said first and second servo valves and the other for opening and closing a second conduit for conveying fluid under pressure to said third and fourth servo valves, and said first detector closes said first shutoff valve in response to pivoting of said first drive member and said second detector closes said second shutoff valve in response to pivoting of said second drive member.

15. A device for operating a valve comprising a command shaft of hybrid force displacement type having means for connection to said valve, a first drive member for shifting the command shaft, said drive member having a pivotal connection to said command shaft, first and second drive elements connected to said drive member on opposite sides of said pivotal connection, each of said drive elements including a pair of first and second drive units acting on said drive member in opposite directions about said pivotal connection, means for varying the force with which said drive units act on said drive member, said means comprising first and second electrically controlled servo valves operatively connected between a fluid source and a respective one of said drive elements; each of said servo valves including an inlet connected to said fluid source and two outlets, and means responsive to varying electrical signals for directing fluid at varying pressures from said inlet to said outlets, said two outlets being in communication with respective ones of said first and second fluid drive units of the respective one of said drive elements for linearly moving said drive member in response to equal movement of said drive elements, said drive member having an arm connected to the respective servo valve by a feed back means, and a detector for detecting pivoting of said arm about said pivotal connection in response to unequal movement of said drive elements, a primary control valve operable for connecting said servo valves to a common supply conduit, said detector being coupled to said primary control valve and is operable to shut off said common fluid supply conduit in response to pivoting of said arm about said pivotal connection.

16. The device of claim 15 in which said arm normally extends parallel with the longitudinal axis of the command shaft and may pivot in either angular direction for actuating the detector upon unequal movement of said drive elements that causes pivotal movement of the drive member.

17. The device of claim 16 wherein there is a common electrical signal source for said servo valves.

18. The device of claim 16 wherein there is a common fluid supply conduit connectable to said servo valves.

19. The device of claim 16 in which there is a second drive member having an arm with a second pivotal connection to said command shaft for shifting the same, said second drive member having operatively associated therewith drive elements, drive units, servo valves and a detector substantially identical in construction and operation to those associated with the first mentioned drive member, and said device having a first inlet conduit connectable to the inlets of the servo valves for the drive units of the first drive member and having a second inlet conduit separate of the first inlet conduit and connectable to the inlets of the servo valves for the drive units of the second drive member.

20. The device of claim 19 in which there is a primary shutoff valve for each of the said first and second inlet conduits and under the control of a respective one of said detectors for closing the respective inlet conduit.

* * * * *